R. H. FRAZIER.
BRAKE ADJUSTER FOR LOCOMOTIVES.
APPLICATION FILED JUNE 17, 1918.
1,291,470.
Patented Jan. 14, 1919.
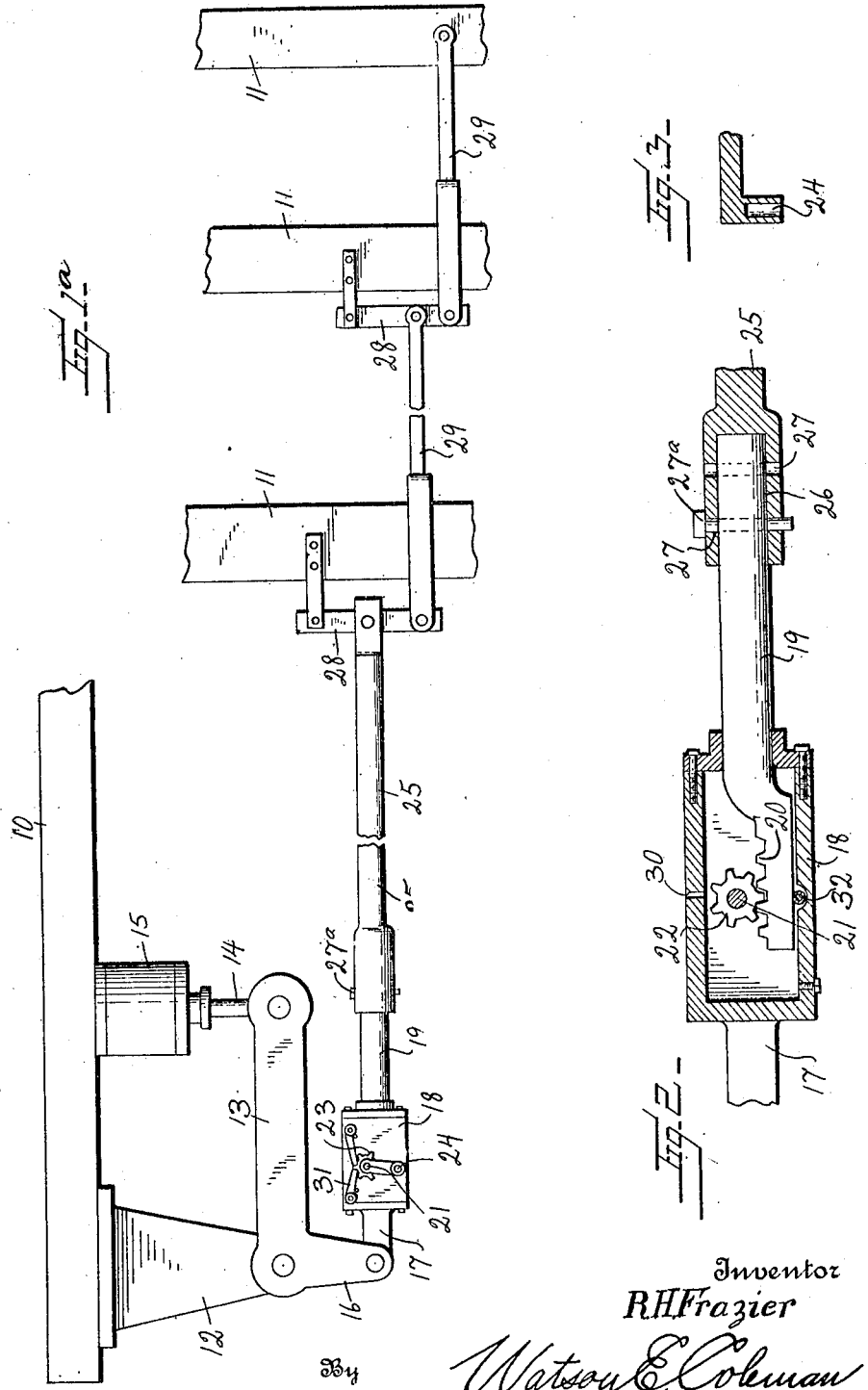
Inventor
R.H.Frazier
By Watson E. Coleman
Attorney

UNITED STATES PATENT OFFICE.

ROY HENRY FRAZIER, OF TOLEDO, OHIO.

BRAKE-ADJUSTER FOR LOCOMOTIVES.

1,291,470.                    Specification of Letters Patent.      Patented Jan. 14, 1919.

Application filed June 17, 1918.   Serial No. 240,406.

*To all whom it may concern:*

Be it known that I, ROY HENRY FRAZIER, a citizen of the United States, residing at Toledo, in the county of Lucas and State of Ohio, have invented certain new and useful Improvements in Brake-Adjusters for Locomotives, of which the following is a specification, reference being had to the accompanying drawings.

This invention relates to locomotive brakes, and particularly to means for adjusting the brake beams, whereby the travel of the brake may be increased or decreased.

In locomotives known to me, this adjustment is commonly secured by forming the slack adjusting pull rod which operatively engages the brake beam or beams with a slot, there being a block disposed in said slot and engaging with a pivot which connects the adjusting rod to the operating lever, and the block being adjusted along the rod by means of a jam nut and screw. Locomotive brake rigging so constructed is exposed to the weather and often becomes rusty and, therefore, hard to adjust. This often times causes delays while the engine and train crew wait for the workman to adjust the brakes, so that they may be fit for service on the road or for hard work. These delays are not only inconvenient, but they are costly.

The general object of my invention is to provide means whereby the connection between the brake beams and the operating lever may be adjusted to control the travel of the brakes, which means is very simple, and which permits this adjustment to be made with but little trouble.

A further object is to provide a mechanism of this character in which the adjusting parts are entirely housed, so that they will not be affected by the weather, and in which these adjusting parts may be readily oiled.

A further object is to provide a construction of this kind which includes a connecting rod or adjusting rod and an adjustable link detachably connected thereto, and forming part thereof, and provide a housing into which said adjustable link extends, which housing is operatively connected to the operating lever, the housing having means whereby the adjustable link may be longitudinally shifted and held in its longitudinally shifted position to thereby adjust the brakes.

Other objects will appear in the course of the following description.

My invention is illustrated in the accompanying drawings, wherein:

Figure 1 is a side elevation of my improved brake rigging.

Fig. 1ª is a plan view of the brake beams.

Fig. 2 is a longitudinal sectional view of the housing 18 and the sections 19 and 25; and Fig. 3 is a sectional view of the crank 24 mounted on the shaft 21.

Referring to these drawings, 10 designates a part of a frame of a locomotive, and 11 a series of brake beams. Mounted upon the frame of the locomotive is the usual bracket 12, upon which is pivotally mounted the usual bell crank lever 13, having its long arm pivotally connected to the piston 14 operating within a brake cylinder 15. All of these parts may be of any ordinary or suitable construction and these parts form no part of my invention.

Pivotally connected to the short arm 16 of the bell crank lever 13, is a sectional pull rod comprising a casting 17, having thereon a housing 18, an adjustable link 19 having telescopic movement into the housing, and an adjusting rod 25 which has adjustable engagement with the link 19. Thus the slack adjusting pull rod is composed of three sections 17, 19 and 25, these sections being adjustable with relation to each other to lengthen and shorten the pull rod as will be now described. The casting 17 is formed to provide a housing 18 through one end of which the adjustable link 19 extends. This link, under ordinary circumstances, will be about 14 inches in length which is sufficient to permit a four inch travel of the link. That portion of the link which extends into the housing 18 is formed with teeth 20 and extending through the housing is a shaft 21 carrying on its inner end a pinion 22 which engages with these teeth.

Mounted upon the shaft 21 and disposed on the exterior of the housing is a ratchet wheel 23 having a plurality of outwardly extending teeth, the shaft 21 adjacent the ratchet wheel being provided with an arm having an angularly extending socket 24 forming a crank handle. The adjusting rod 25 at its rear end is hollow as at 26 to receive the adjacent end of the link 19 and this hollow portion is transversely perforated at a plurality of points as at 27 for the passage of the pin 27ª which connects the rod 25 with the link 19. At its forward end the adjusting rod 25 is operatively connected to the usual lever 28 of the brake rigging. Each of the brake beams is provided with a lever 28, the lever being mounted at one end upon the brake beam and at its other end being connected to a connecting rod 29, the connecting rod from one lever 28 extending and being connected to the next adjacent lever 28 at a point between the pivotal support for this lever and the pivotal connection to the next connecting rod. The adjusting rod 25 is connected to the first of the levers 28 between its pivotal support and the connecting rod 29, as is usual.

The housing 18 is to be provided with an oil inlet opening 30 and mounted upon the face of the housing are the pawls 31, which are adapted to engage with the ratchet teeth on the ratchet 23, these pawls holding the ratchet from movement in either direction when the pawls are engaged with the ratchet. The link 19 and the rod 25 may be shifted to adjust the brake beams by inserting any suitable implement in the socket 24 and rotating the ratchet, the pawls being, of course, previously shifted out of engagement with the ratchet.

This construction enables a workman to quickly and easily adjust the brakes by sticking a bar or bolt in under the cylinder of the locomotive and giving a few turns to the shaft 21. With this construction the adjusting mechanism is entirely housed from the effect of weather, and if kept properly oiled will work easily at all times. It is obvious that this manner of adjustment does not require any change in the ordinary brake rigging but merely the substitution of one form of slack adjusting pull rod for another. It will likewise be seen that in effect my slack adjusting pull rod is formed of three sections, the sections 17, 19 and 25, two of the sections being longitudinally adjustable with relation to each other.

Preferably the adjustable link 19 rests upon the roller 32 mounted in the housing 18 but any other mounting of this character which will permit the free movement of the rise post relative to the housing 18 may be used. The housing 18 is intended to be filled with oil through the duct 30 or by means of other suitable lubricating ducts, 60 the several bearings may be oiled.

Having described my invention, what I claim is:

1. The combination with a brake beam and brake operating means including a lever, of means connecting the lever to the brake beam including a housing pivotally connected to the lever, a member entering the housing having telescopic movement therein, a shaft passing through the housing, means upon said shaft operatively engaging the shaft with said member, and means upon the exterior of the housing for rotating said shaft to thereby shift said member and for holding the shaft in its rotated positions.

2. The combination with a brake beam and brake operating means including a lever, of means connecting the lever to the brake beam including a housing pivotally connected to the lever, a member entering the housing having telescopic movement therein, a shaft passing through the housing and operatively engaged with said member to shift it upon a rotation of the shaft, a ratchet wheel mounted upon the shaft on the exterior of the housing, pawls engaging said ratchet wheel and holding it from movement, and an arm on the ratchet wheel having a socket for the reception of an implement whereby the ratchet wheel may be turned.

3. The combination with a brake beam and operating mechanism therefor, including a lever, of means for connecting the lever to the brake beam comprising a hollow housing pivotally connected to the lever, a link slidable through one end of the housing, a rod having a socket at one end receiving the adjacent end of the link and being detachably connected thereto, the opposite end of said rod being operatively connected to the brake beam, and means for adjusting the link including a shaft passing through the housing and carrying a pinion engaging the rack teeth on the link, a ratchet wheel on the exterior of the housing mounted on the shaft, pawls engaging the ratchet wheel and holding it in adjusted positions, and a crank arm connected to the ratchet wheel and having a socket for the reception of an implement whereby the ratchet wheel may be turned.

In testimony whereof I hereunto affix my signature in the presence of two witnesses.

ROY HENRY FRAZIER.

Witnesses:
 JOHN HABERSTOCK,
 ROSS E. PARKER.

Copies of this patent may be obtained for five cents each, by addressing the "Commissioner of Patents, Washington, D. C."